United States Patent [19]

Bruce-Walker

[11] Patent Number: 4,558,790

[45] Date of Patent: Dec. 17, 1985

[54] SYSTEM FOR LOAD HANDLING OF AIRCRAFT

[75] Inventor: Patrick Bruce-Walker, Queanbeyan, Australia

[73] Assignee: The Commonwealth of Australia Department of Defense Support, Canberra, Australia

[21] Appl. No.: 515,058

[22] PCT Filed: Oct. 22, 1982

[86] PCT No.: PCT/AU82/00172
§ 371 Date: May 30, 1984
§ 102(e) Date: May 30, 1984

[87] PCT Pub. No.: WO83/01428
PCT Pub. Date: Apr. 28, 1983

[30] Foreign Application Priority Data

Oct. 22, 1981 [AU] Australia ................. PF1238

[51] Int. Cl.⁴ .................................. B64F 1/22
[52] U.S. Cl. ........................... 212/77; 244/115; 244/116; 114/258; 114/261
[58] Field of Search ............. 244/114 R, 115, 116; 114/230, 258, 261, 262, 263; 104/173 R, 182; 212/77, 76, 215, 214, 205, 207

[56] References Cited

U.S. PATENT DOCUMENTS

| 1,708,912 | 4/1929 | Alexander | 104/173 R |
|---|---|---|---|
| 2,411,382 | 11/1946 | Martin | 114/230 |
| 3,065,861 | 11/1962 | Cruciani | 212/77 |
| 3,333,713 | 8/1967 | Cruciani | 212/76 |
| 3,640,490 | 2/1972 | Baekken | 244/116 |

FOREIGN PATENT DOCUMENTS

| 0047638 | 3/1982 | European Pat. Off. | |
| 0148689 | 11/1980 | Japan | 244/116 |

Primary Examiner—Galen L. Barefoot
Attorney, Agent, or Firm—Balogh, Osann, Kramer, Dvorak, Genova & Traub

[57] ABSTRACT

A load moving system, for moving articles such as a helicopter (18) form a port hangar (19a) to a starboard hangar (19b) or vice versa, wherein four trolleys (2 and 13) run on two rails (R) and are cabled to two after winches (3) and two forward winches (14). Vertical roller fairlands (12) act as cable runners. Two control positions (4 and 15) are provided from which the system may be operated.

1 Claim, 8 Drawing Figures

SYSTEM FOR LOAD HANDLING OF AIRCRAFT

This invention relates to a system which achieves the controlled movement against surging or other deviation across a surface, which could be rolling, pitching, heaving or inclined, of a load which could be carried on a combination of castoring and fixed wheels or be capable of skidding or sliding over the surface, or to provide control of the movement of a lighter than air body in circumstances where it is sufficiently close to the ground, with the minimum of cables.

The controlled movement is effected by varying the tension and pull in or pay out of a number of running cables connected to fixing points on the load via pulleys carried on "trolleys" which in turn are guided by tracks extending along each side of the area to be traversed. Each "trolley" is located relative to the load by a second cable of set length obliquely from the "trolley" to another fixing point on the load remote from that to which its running cable is attached.

Should there be an increased requirement for lateral restraint on either or both ends of the load in relation to forward or backward towing capacity opposite pairs of running cables can be led through pulleys at their attachment points at the load and terminated back on their respective "trolleys" and thus double their mechanical advantage in lateral restraint.

Where the concepts of this invention are used to move and restrain loads across an inclined surface there could be combinations of load weight, rolling or sliding friction and degree of surface inclination where only the uphill rail and its "trolleys" and cables are necessary.

Additional applications of the cable, rail and "trolley" basic concept already described could be in the control of ships, lighters or floating masses in confined and/or tortuous waterways or docks of a length limited to the practicable length of cable employable, and in the guidance of lighter than air ships to and from mooring pylons and hangar.

More specifically, this invention relates to the problems of moving helicopters or other aircraft from the position of initial restraint by mechanical or other means after landing on a ship's flight deck, into a hangar or secure stowage area and, when required, provides for the movement back thereof to the take off position—both operations may have to take place in heavy weather and consequent violet ship motion.

The invention in fact provides an alternative to present traverse and restraint systems devised by the various naval defence forces. It can be used in combination with the initial decklocks employed in any of these systems. It is equally effective with tricycle or tailwheel aircraft types.

The invention permits the steering of an aircraft from the landing position into an offset or centerline hangar or secure stowage, and similarly its ranging for take off, without tire scuffing and with the minimum possibility of inadequate restraint in rough weather. Basically the system relies on two operators, under the control of a Landing Safety Officer, controlling four winches whose cables each lead to "trolleys" running in low profile guide rails fixed to the flight deck and bounded by shallow ramps. A further two winches may be used in relation to a second hangar.

Each winch cable passes through a sheave carried by its associated "trolley" whence it leads to one of four fixing points on the aircraft, two on either side thereof. A second cable of set length according to aircraft type connects each trolley to the other fixing point on that side of the aircraft.

It will be appreciated that the two after winches can provide lateral restraint, steering and a braking function for tail wheel aircraft during a move forward into the hangar, while the forward winches are used principally to tow the aircraft while at the same time providing lateral restraint to the aircraft should ship's roll invite a sideways skid of main wheels. A reverse of this operation will range the aircraft for take off. The steps of these operations are described later in the specification.

The term "trolley" has been used in a broad sense and equates to runners or like devices.

In its broadest form, the invention provides a load handling system comprising two pairs of spaced winch means, a pair of guide rails extending more or less between said winch means, two pairs of trolley means moveable along said guide rails and cable means connecting said winch means and said trolley means.

A better understanding of the invention will be gained from a consideration of the accompanying drawings in which:

FIGS. 4 and 4a show details of the trolley mechanism of the system;

Figure 6:
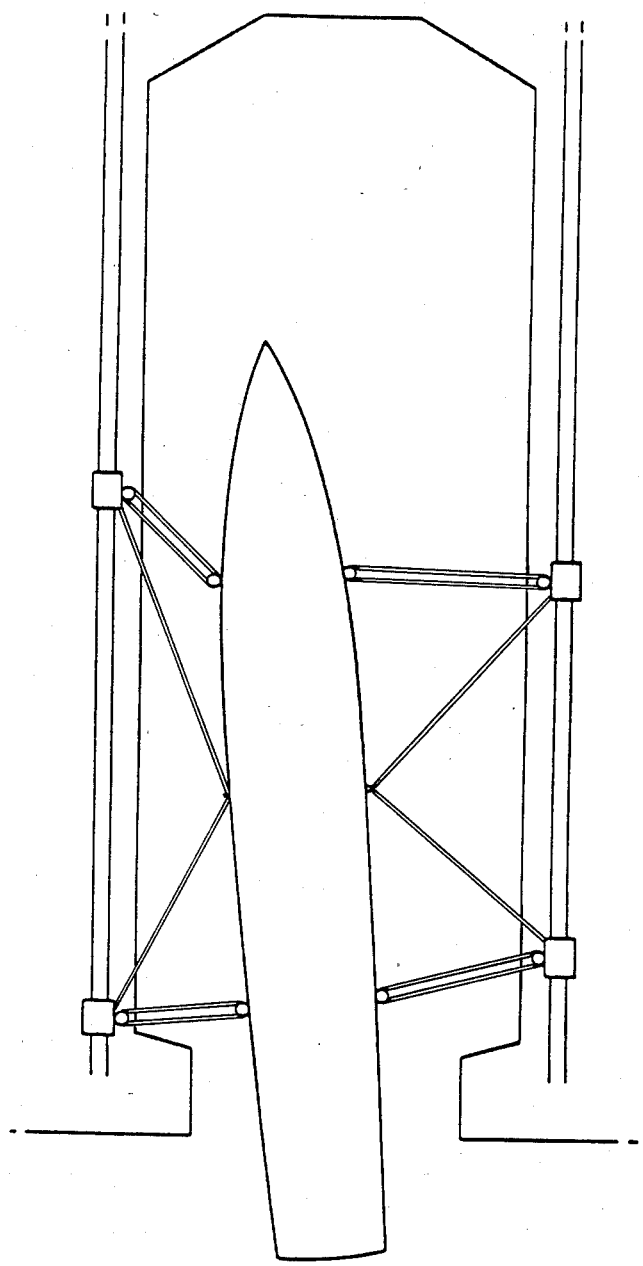
Figure 7:
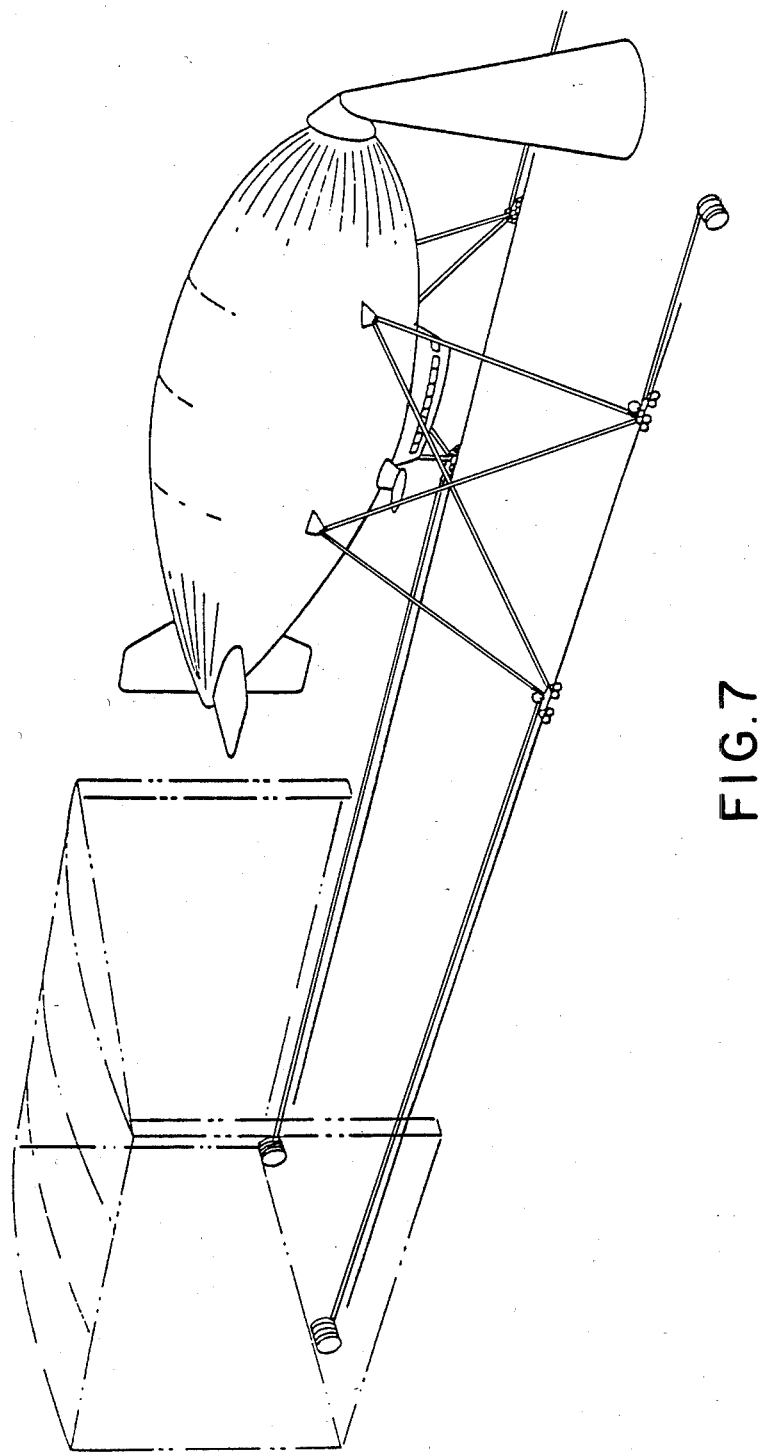

FIGS. 6 and 7 respectively showing two further uses of the system of the invention.

Figure 1:
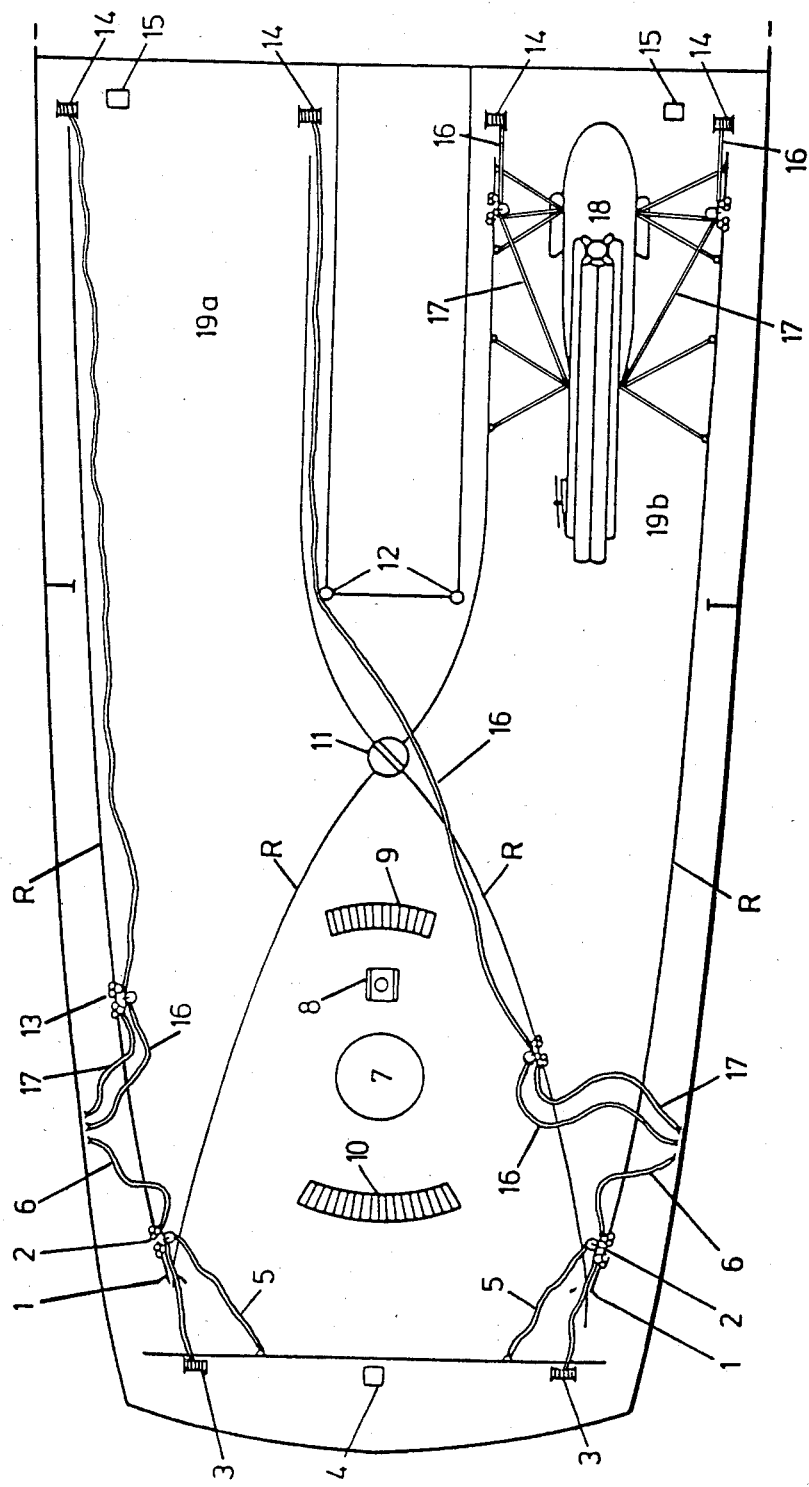
FIG. 1 is a plan of a shipborne flight deck fitted with the system of the invention.

FIG. 1 in which the aft direction is to the left and forward direction to the right, shows a multiple system for moving helicopters on the flight deck of a vessel to or from a port hangar 19a or starboard hangar 19b. There are two sets of rails R, one for port and one for starboard. Points 1 and crossing 11 are shown switched into position for use of the port rails. After trolleys 2 and forward trolleys 13 run on rails R. After winches 3 and forward winches 14 are respectively cabled to said trolleys. Note that there are four forward winches, two for each hangar. The after winch control position 4 is located centrally of winches 3 and is normally not manned until after the rotors of the helicopter have stopped. The positions 15 represent the forward winches' control stations, one for hangar 19a and one for 19b. Cables 5 and 16 are the after and forward main cables respectively, shown stopped down pending arrival of a helicopter. Cables 6 and 17 are respectively the after and forward set length cables, also shown stopped down. Item 7 is an R.N. type initial decklock, known as a "harpoon grid" and 8 is a U.S.N. type initial decklock and hauldown device, known as a "beartrap". The nost and tail probe grids are indicated respectively at 9 and 10. A helicopter 18 is shown secured in starboard hangar 19b by standard tie downs and starboard forward traverse and restraint cables. A set of vertical roller fairleads 12 act as cable runners during operation of the system.

Figure 2:
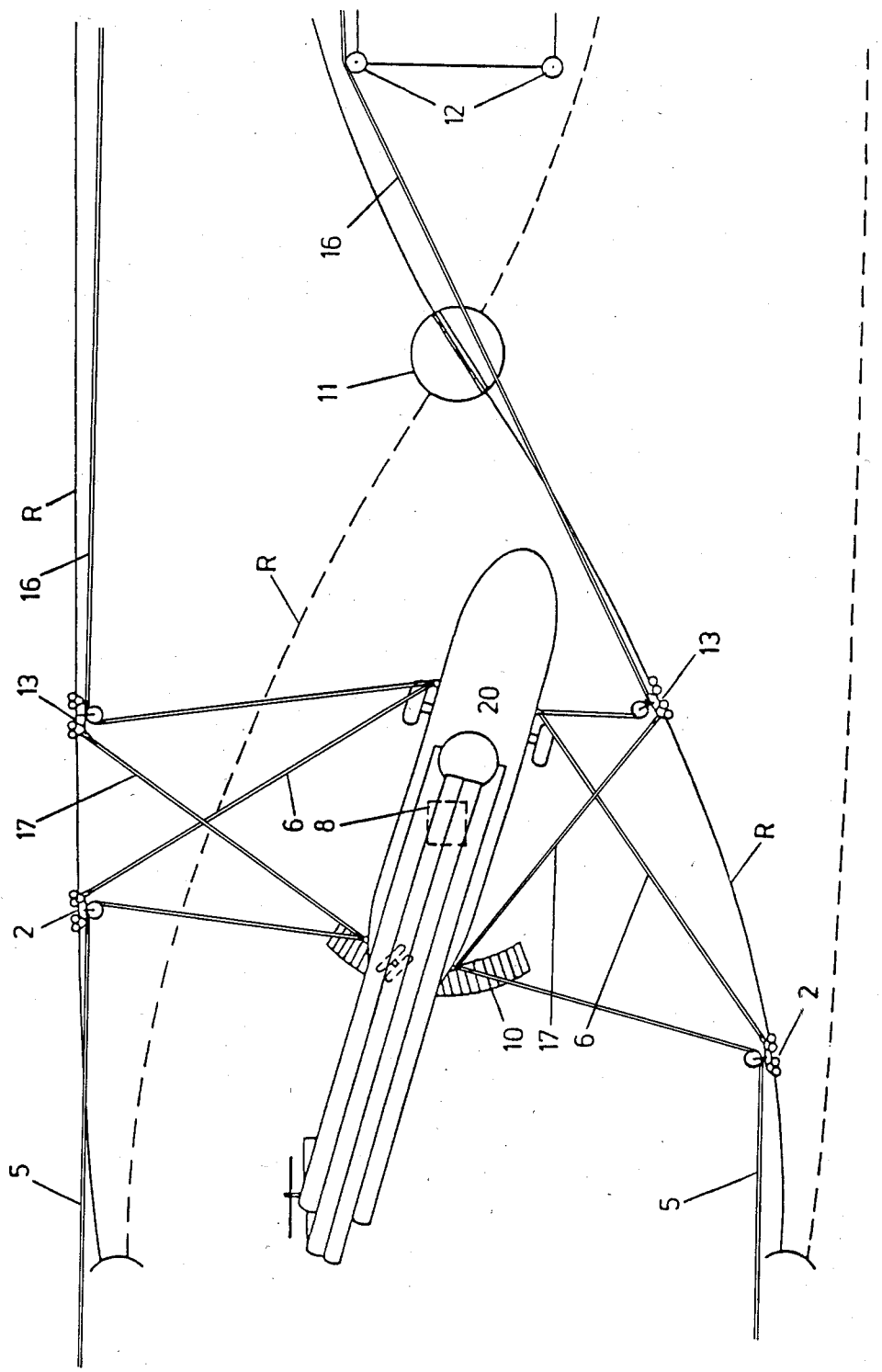
FIG. 2 shows the layout of FIG. 1 in use.

In FIG. 2 is shown a more detailed view of the system of FIG. 1 handling a helicopter 20 which is to be secured in port hangar 19a—the helicopter being of the type having fixed nose wheels and a castoring or steerable tail wheel.

Figure 3:
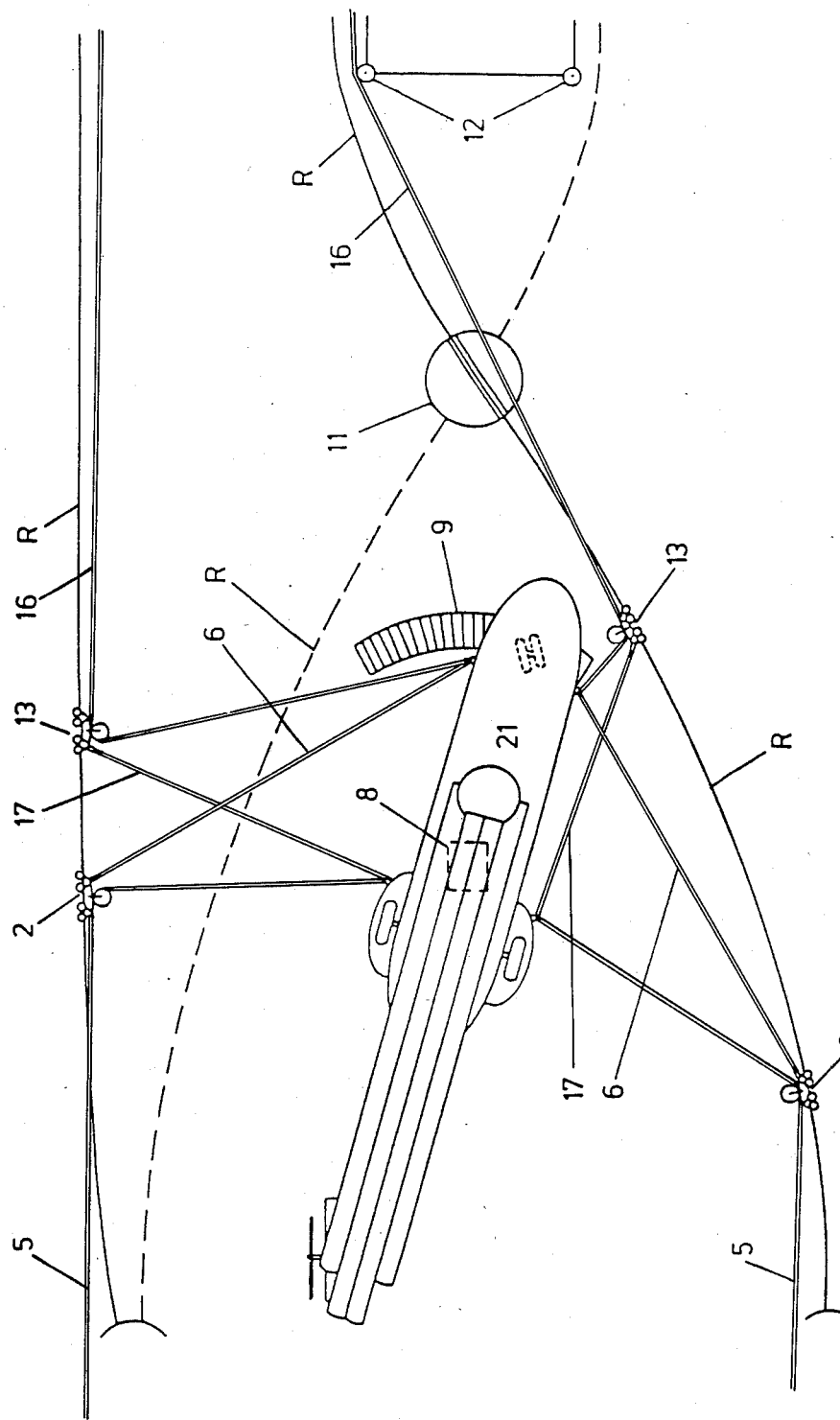
FIG. 3 shows the system of FIG. 1 in use with a load where the center of gravity is towards one end thereof.

FIG. 3 is a similar view of the system of FIG. 1 in operation but handling a helicopter 21 having a castoring or steerable nose wheel.

Figure 4:
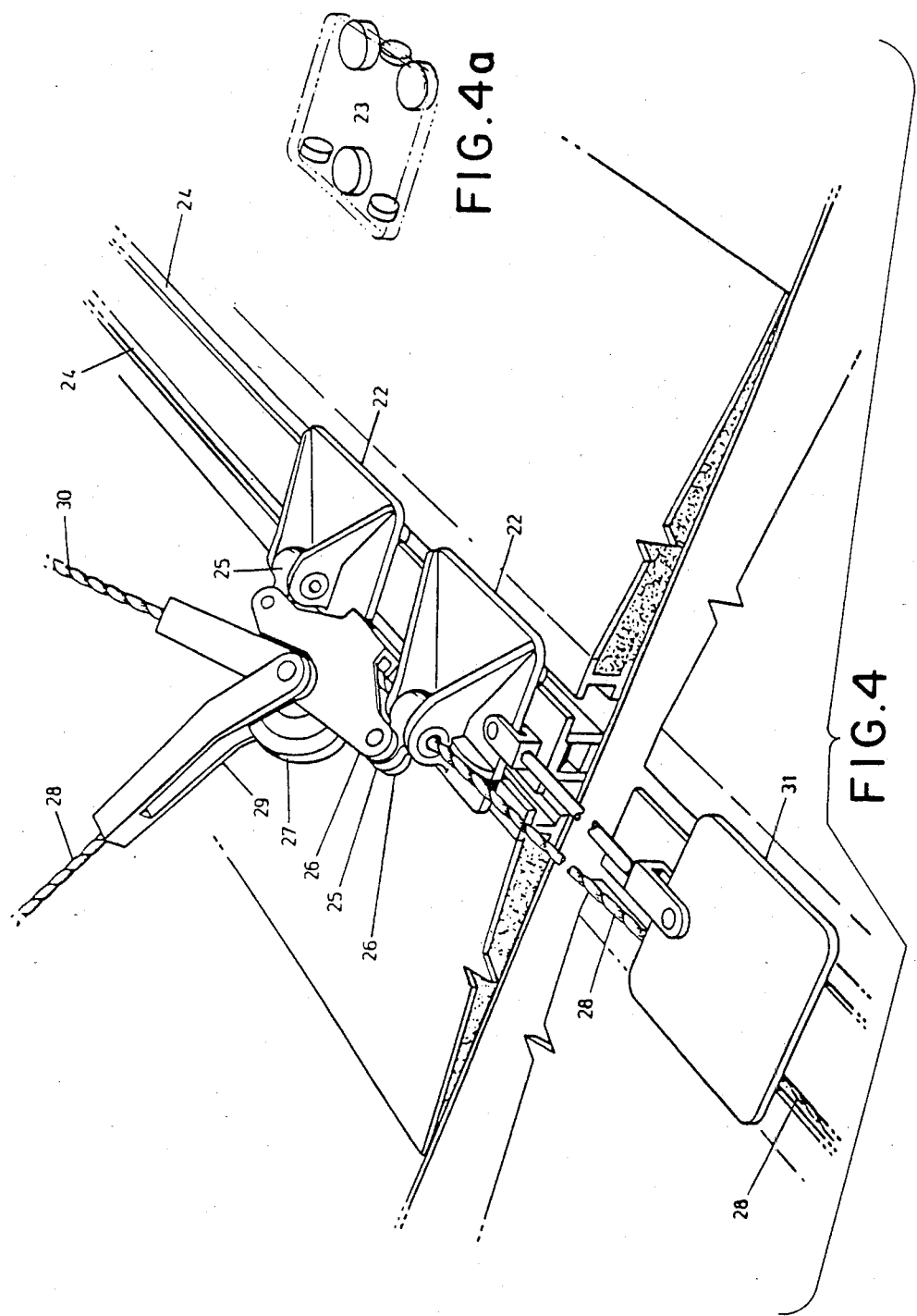

Referring now to FIGS. 4 and 4A, a trolley comprises a pair of bogies 22 whose rollers 23 (FIG. 4A), running in twin parallel tracks 24, restrain them from vertical or sideways movement. The bogies 22 are coupled via swivel pieces 25 to a pair of plates 26 between which a pulley 27 is carried. The winch cable 28 passes round this pulley on which it is retained by a swinging fairlead 29 while the set length cable 30 is attached to the axis of the pulley, on which it too can swing, and led obliquely to the other fixing point on that side of the helicopter.

Trailer bogey 31, an optional fitting can be used to lead and confine the winch cable in a track to avoid the dangers of exposed cables.

Figure 5:
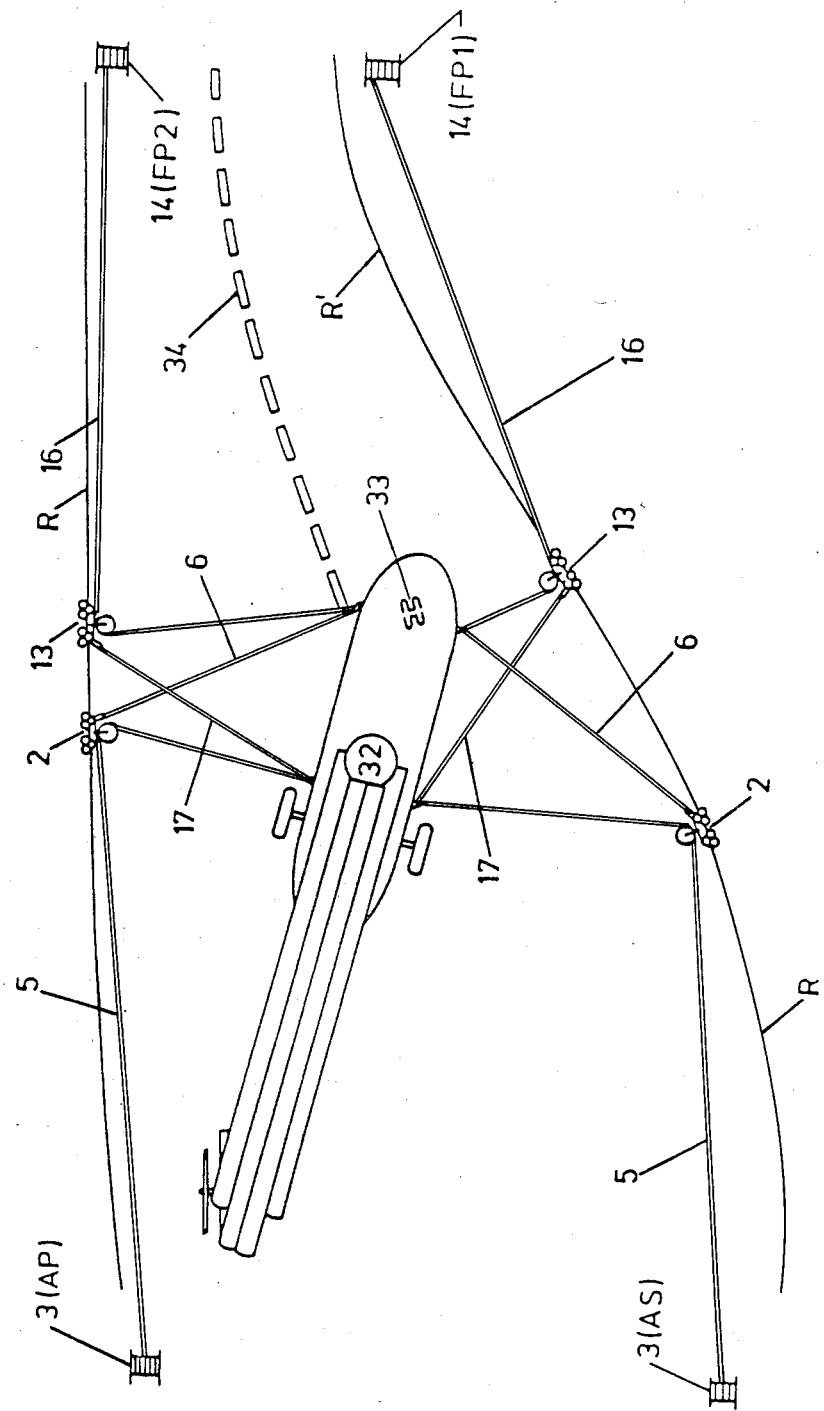
FIG. 5 shows a simplified version of the system of FIG. 1.

FIG. 5 illustrates the operation of the system of FIG. 1. It is desired to hangar helicopter 32 having castoring or steerable nose wheel 33 into the port hangar along path 34. As before, the numbers 3 indicate the after winches, with (AP) being the after port winch and (AS) being the after starboard winch. Similarly, 14 ($FP_1$) and 14 ($FP_2$) are numbers 1 and 2 forward port winches respectively. In order to move the helicopter 32 as required, uniform tension is first applied to the cables by winches 3(AS), 3(AP) and 14($FP_1$), 14($FP_2$) acting in unison. Winch 14($FP_2$) is then wound in and winch 14($FP_1$) slackened thus causing the nose of the helicopter to move onto track 34. Winch 14($FP_1$) is then wound in until its cable is equi-tensioned to that of winch 14($FP_2$). At the same time the tension on the cables to the after winches is slackened. This will enable the helicopter to move up the track 34 towards the forward winches. Steering is done by adjustment of the relative tension applied by the two forward winches, and braking is controlled by increasing the tension applied by the aft winches, and, if necessary, slackening off the tension applied by forward winches. When the helicopter is in desired position in the hangar, uniform tension is applied by each of the 4 winches which may then be locked. If desired the helicopter can be then secured by other means, and cables 5, 6, 16, 17 can be then cast off after releasing the tension therein.

FIG. 6 illustrates how the system of the invention can be used to dock a ship, while FIG. 7 illustrates how the system can be used to move an airship between a hangar and a docking pylon.

It might also be realized that if it is desired to move a load in a direction transverse of which gravity is the main factor (e.g. along the side of a building, or a hill), then only one rear and one forward winch and one rail are required.

I claim:

1. A system for load handling comprising two pairs of spaced winch means, a pair of guide rails extending more or less between said winch means, two pairs of trolley means moveable along said guide rails, and cable means connecting said winch means and said trolley means, wherein each said trolley means has thereon a pulley and a cable fixing point, and said load has thereon a pair of cable fixing points spaced apart, and the cable means form one said winch passes around the pulley on the trolley means closest to itself and passes to a first fixing point on said load, said first fixing point being connected by a set length cable means to the fixing point on the other said trolley means, and said second winch means is likewise connected to the other said trolley means and the second fixing point on said load.

* * * * *